Figure 1:
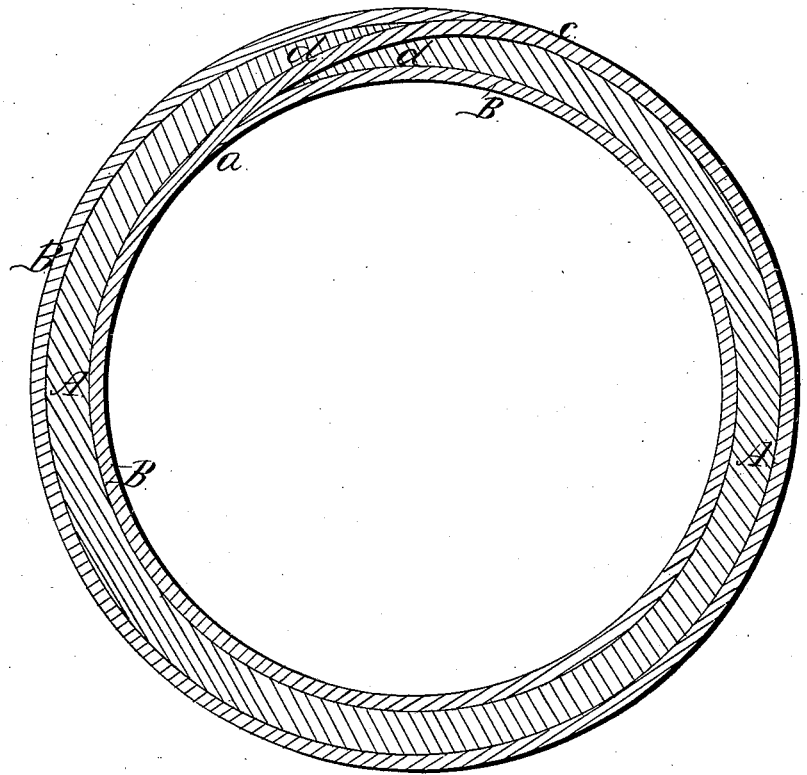

J. & J. A. Punderford,
Leather Hose.

Nº 60,555.    Patented Dec. 18, 1866.

Witnesses    Inventors
John H. Shumney    J. & J. A. Punderford
A. J. Tibbits    By their Atty
    John E. Earle

United States Patent Office.

IMPROVEMENT IN THE MANUFACTURE OF LEATHER HOSE.

JAMES AND JAMES A. PUNDERFORD, OF NEW HAVEN, CONNECTICUT.

Letters Patent No. 60,555, dated December 18, 1866.

*The Schedule referred to in these Letters Patent and making part of the same.*

TO ALL WHOM IT MAY CONCERN:

Be it known that we, JAMES and JAMES A. PUNDERFORD, of New Haven, in the county of New Haven, and State of Connecticut, have invented a new Improvement in Leather Hose; and we do hereby declare the following, when taken in connection with the accompanying drawings, and the letters of reference marked thereon, to be a full, clear, and exact description of the same, and which said drawing constitutes part of this specification, and represents an enlarged sectional view of a hose embodying our improvement.

This invention relates to an improvement in leather hose, which, while it renders the leather water-proof, dispenses entirely with the use of rivets in its manufacture, and consists in coating the leather with India rubber, gutta percha, or similar vulcanizable gums while in a plastic state, then doubling the two edges so as to lap the coated surface of one edge on to the other; then, while the edges are securely held together, subject to a heat of about 250° for the space of four hours, more or less, to cure or vulcanize the gum, which, when done, the hose is complete, and more firmly secured than is possible with rivets, and the water prevented from contact with the leather at any point.

To enable others to construct our improvement, we will proceed to describe the same as illustrated in the accompanying drawing.

From leather, such as is commonly used for the manufacture of hose, we cut to the proper width so as to allow the necessary lap, as seen in the drawing A, representing the leather; then, by use of the currying-knife or other suitable instrument, remove the surface of the grain or flesh, and then shave the two edges so that the lap will make little or no increase in thickness, and then apply a coat of oxalic acid in liquid state for the purpose of destroying or neutralizing the oily particles or whatever may have a tendency to prevent the adhesion of gum to the leather; and, in some cases, a coat of camphene after the oxalic acid; then, when the leather is thoroughly dry, we place a sheet of fabric coated with rubber B, or similar gum prepared for vulcanizing in the usual manner, upon both sides; and, while the rubber is in a plastic state, place the sheet upon the inside of the leather—say, beginning at the point $a$, passing around upon the inside and bringing the two laps $d$ together; the rubber passes out between the laps and around the outside, stopping at $c$, the edges $a$ and $c$ overlapping, as seen in the drawing; then, while firmly held in this position, we submit the hose to a regulated heat of about 250° for the space of four hours, more or less, until the gum is thoroughly vulcanized. The process of vulcanization causes the gum to so firmly adhere to the leather that the lapped edges of the leather are more firmly secured than is possible to be done with rivets, and the hose thus prepared possesses all the advantages of the leather, and is perfectly water-proof both upon the out and inside. If it is not desired to cover the outside, the coating should be stopped outside the lapped edges.

We have described the coating as made with fabricated rubber. This we prefer both for its convenience in application and increased strength when finished; yet, the gum may be applied directly to the rubber without the necessary use of the fabric.

In some cases it may not be necessary to line or coat the inside of the hose, but simply to form a perfectly water-proof joint. To do this, simply coat the surface of the joint or lap with the gum, then join the two laps and vulcanize as before described.

We do not wish to be understood as broadly claiming the application of a water-proof lining to the inner surface of the hose, and extending such lining between the laps, as this was secured to us by Letters Patent issued to JAMES PUNDERFORD, April 26, 1859; but, in that patent, the lining is a succession of coats of India-rubber cement unvulcanized; but—

What we do claim as our invention, and desire to secure by Letters Patent, is—

1. Forming the joint in leather hose by the application to the surface of the laps of a vulcanizable gum, and curing the same after such application, substantially as herein set forth.

2. Coating the inner, or outer, or both surfaces of leather hose with a vulcanizable gum, and curing the same after such coating, substantially as herein set forth.

3. Coating the outer and inner surface and the joint or laps by a single sheet of fabricated rubber, substantially as herein set forth.

JAMES PUNDERFORD,
JAMES A. PUNDERFORD.

Witnesses:
JOHN H. SHUMWAY,
A. J. TIBBITS.